US008677252B2

(12) United States Patent
Christiansen

(10) Patent No.: US 8,677,252 B2
(45) Date of Patent: Mar. 18, 2014

(54) SYSTEMS AND METHODS FOR DISPLAYING TO A PRESENTER VISUAL FEEDBACK CORRESPONDING TO VISUAL CHANGES RECEIVED BY VIEWERS

(75) Inventor: Bernd Christiansen, Santa Barbara, CA (US)

(73) Assignee: Citrix Online LLC, Goleta, CA (US)

( * ) Notice: Subject to any disclaimer, the term of this patent is extended or adjusted under 35 U.S.C. 154(b) by 0 days.

(21) Appl. No.: 11/279,830

(22) Filed: Apr. 14, 2006

(65) Prior Publication Data
US 2007/0245248 A1 Oct. 18, 2007

(51) Int. Cl.
*G06F 3/00* (2006.01)

(52) U.S. Cl.
USPC ........... 715/753; 715/750; 715/751; 715/752; 715/758

(58) Field of Classification Search
USPC .................. 715/751, 753, 781, 730
See application file for complete search history.

(56) References Cited

U.S. PATENT DOCUMENTS

| 4,974,173 A | | 11/1990 | Stefik et al. | |
|---|---|---|---|---|
| 5,255,361 A | | 10/1993 | Callaway et al. | |
| 5,367,633 A | | 11/1994 | Matheny et al. | |
| 5,553,083 A | * | 9/1996 | Miller | 714/748 |
| 5,619,638 A | | 4/1997 | Duggan et al. | |
| 5,682,196 A | * | 10/1997 | Freeman | 725/139 |
| 5,696,948 A | | 12/1997 | Cruz et al. | |
| 5,726,669 A | | 3/1998 | Obata et al. | |
| 5,758,110 A | | 5/1998 | Boss et al. | |
| 5,768,614 A | | 6/1998 | Takagi et al. | |
| 5,793,973 A | * | 8/1998 | Birdwell et al. | 709/223 |
| 5,812,780 A | | 9/1998 | Chen et al. | |
| 5,874,960 A | * | 2/1999 | Mairs et al. | 715/733 |
| 5,913,920 A | | 6/1999 | Adams et al. | |
| 6,002,394 A | | 12/1999 | Schein et al. | |

(Continued)

FOREIGN PATENT DOCUMENTS

| EP | 576183 | 12/1993 |
|---|---|---|
| EP | 1087618 | 3/2001 |
| WO | WO-2004072804 | 8/2004 |

OTHER PUBLICATIONS

International Search Report for corresponding International Application No. PCT/US2007/009019, mailed Oct. 2, 2007 (3 pages).

(Continued)

*Primary Examiner* — Amy Ng
*Assistant Examiner* — Meseker Takele
(74) *Attorney, Agent, or Firm* — McDermott Will & Emery LLP

(57) ABSTRACT

Methods for providing to the presenter visual feedback regarding the screen data received by one or more viewers in an online presentation environment having a presenter transmitting screen data to one or more viewers over a network may include: transmitting data representing changed visual data; receiving confirmation of receipt of the changed visual data from one or more viewers; generating a representation of the visual data received by one or more viewers responsive to the received confirmation data; and displaying the generated representation at the presenter. Corresponding systems may include: a transmitter which transmits data representing changed visual data; a receiver which receives confirmation of receipt of the changed visual data from one or more viewers; and a display generator which generates a representation of the visual data received by one or more viewers responsive to the received confirmation data, and which displays the generated representation at the presenter.

33 Claims, 10 Drawing Sheets

(56) References Cited

U.S. PATENT DOCUMENTS

| | | | |
|---|---|---|---|
| 6,108,662 A | 8/2000 | Hoskins et al. | |
| 6,118,521 A | 9/2000 | Jung et al. | |
| 6,155,840 A * | 12/2000 | Sallette | 434/323 |
| 6,157,864 A | 12/2000 | Schwenke et al. | |
| 6,161,051 A | 12/2000 | Hafemann et al. | |
| 6,167,406 A | 12/2000 | Hoskins et al. | |
| 6,246,471 B1 | 6/2001 | Jung et al. | |
| 6,246,479 B1 | 6/2001 | Jung et al. | |
| 6,249,348 B1 | 6/2001 | Jung et al. | |
| 6,250,548 B1 | 6/2001 | McClure et al. | |
| 6,256,773 B1 | 7/2001 | Bowman-Amuah | |
| 6,263,501 B1 | 7/2001 | Schein et al. | |
| 6,268,853 B1 | 7/2001 | Hoskins et al. | |
| 6,295,513 B1 | 9/2001 | Thackston | |
| 6,324,647 B1 | 11/2001 | Bowman-Amuah | |
| 6,329,984 B1 | 12/2001 | Boss et al. | |
| 6,362,888 B1 | 3/2002 | Jung et al. | |
| 6,370,573 B1 | 4/2002 | Bowman-Amuah | |
| 6,373,573 B1 | 4/2002 | Jung et al. | |
| 6,388,714 B1 | 5/2002 | Schein et al. | |
| 6,397,036 B1 | 5/2002 | Thean et al. | |
| 6,405,364 B1 | 6/2002 | Bowman-Amuah | |
| 6,414,750 B2 | 7/2002 | Jung et al. | |
| 6,449,041 B1 | 9/2002 | Jung et al. | |
| 6,473,794 B1 | 10/2002 | Guheen et al. | |
| 6,519,037 B2 | 2/2003 | Jung et al. | |
| 6,519,571 B1 | 2/2003 | Guheen et al. | |
| 6,523,027 B1 | 2/2003 | Underwood | |
| 6,536,037 B1 | 3/2003 | Guheen et al. | |
| 6,539,429 B2 | 3/2003 | Rakavy et al. | |
| 6,556,950 B1 | 4/2003 | Schwenke et al. | |
| 6,560,648 B1 * | 5/2003 | Dunn et al. | 709/224 |
| 6,567,813 B1 | 5/2003 | Zhu et al. | |
| 6,581,824 B1 | 6/2003 | McClure et al. | |
| 6,583,866 B2 | 6/2003 | Jung et al. | |
| 6,590,660 B2 | 7/2003 | Jung et al. | |
| 6,601,098 B1 * | 7/2003 | Case et al. | 709/224 |
| 6,601,233 B1 | 7/2003 | Underwood | |
| 6,609,128 B1 | 8/2003 | Underwood | |
| 6,615,166 B1 | 9/2003 | Guheen et al. | |
| 6,629,081 B1 | 9/2003 | Cornelius et al. | |
| 6,633,878 B1 | 10/2003 | Underwood | |
| 6,636,585 B2 | 10/2003 | Salzberg et al. | |
| 6,641,033 B2 | 11/2003 | McClure et al. | |
| 6,643,696 B2 | 11/2003 | Davis et al. | |
| 6,658,464 B2 | 12/2003 | Reisman | |
| 6,662,223 B1 * | 12/2003 | Zhang et al. | 709/224 |
| 6,662,357 B1 | 12/2003 | Bowman-Amuah | |
| 6,662,998 B2 | 12/2003 | McClure et al. | |
| 6,669,485 B2 | 12/2003 | Thean et al. | |
| 6,678,355 B2 | 1/2004 | Eringis et al. | |
| 6,688,517 B1 | 2/2004 | McClure et al. | |
| 6,701,345 B1 | 3/2004 | Carley et al. | |
| 6,704,873 B1 | 3/2004 | Underwood | |
| 6,718,535 B1 | 4/2004 | Underwood | |
| 6,721,713 B1 | 4/2004 | Guheen et al. | |
| 6,728,753 B1 | 4/2004 | Parasnis et al. | |
| 6,732,369 B1 | 5/2004 | Schein et al. | |
| 6,745,170 B2 | 6/2004 | Bertrand et al. | |
| RE38,609 E | 10/2004 | Chen et al. | |
| 6,801,939 B1 * | 10/2004 | Chafe | 709/224 |
| 6,862,553 B2 | 3/2005 | Schwenke et al. | |
| 6,870,616 B2 | 3/2005 | Jung et al. | |
| 6,885,920 B2 | 4/2005 | Yakes et al. | |
| 6,915,955 B2 | 7/2005 | Jung et al. | |
| 6,920,502 B2 | 7/2005 | Araujo et al. | |
| 6,928,396 B2 | 8/2005 | Thackston | |
| 6,934,578 B2 | 8/2005 | Ramseth | |
| 6,947,914 B2 | 9/2005 | Bertrand et al. | |
| 6,957,186 B1 | 10/2005 | Guheen et al. | |
| 6,970,858 B1 | 11/2005 | Nichols | |
| 6,980,962 B1 | 12/2005 | Arganbright et al. | |
| 6,993,421 B2 | 1/2006 | Pillar et al. | |
| 6,993,456 B2 | 1/2006 | Brooks et al. | |
| 7,035,907 B1 | 4/2006 | Decasper et al. | |
| 7,046,382 B1 * | 5/2006 | Chu | 358/1.15 |
| 7,054,848 B1 | 5/2006 | Lannert et al. | |
| 7,065,512 B1 | 6/2006 | Bertrand et al. | |
| 7,065,513 B1 | 6/2006 | Bertrand et al. | |
| 7,069,186 B2 | 6/2006 | Jung et al. | |
| 7,069,234 B1 | 6/2006 | Cornelius et al. | |
| 7,089,222 B1 | 8/2006 | Lannert et al. | |
| 7,100,195 B1 | 8/2006 | Underwood | |
| 7,117,189 B1 | 10/2006 | Nichols et al. | |
| 7,139,999 B2 | 11/2006 | Bowman-Amuah | |
| 7,149,698 B2 | 12/2006 | Guheen et al. | |
| 7,156,665 B1 | 1/2007 | O'Connor et al. | |
| 7,165,041 B1 | 1/2007 | Guheen et al. | |
| 7,167,844 B1 | 1/2007 | Leong et al. | |
| 7,171,174 B2 | 1/2007 | Ellis et al. | |
| 7,181,419 B1 | 2/2007 | Mesaros | |
| 7,184,866 B2 | 2/2007 | Squires et al. | |
| 7,194,444 B1 | 3/2007 | Nichols | |
| 7,212,622 B2 * | 5/2007 | Delaney et al. | 379/221.02 |
| 7,424,730 B2 * | 9/2008 | Chou | 725/87 |
| 7,827,276 B2 * | 11/2010 | Swinton et al. | 709/224 |
| 7,830,814 B1 * | 11/2010 | Allen et al. | 370/252 |
| 8,166,401 B2 * | 4/2012 | Hookham-Miller | 715/730 |
| 8,307,273 B2 * | 11/2012 | Pea et al. | 715/201 |
| 2001/0047406 A1 | 11/2001 | Araujo et al. | |
| 2002/0029285 A1 | 3/2002 | Collins | |
| 2002/0032725 A1 | 3/2002 | Araujo et al. | |
| 2003/0110296 A1 * | 6/2003 | Kirsch et al. | 709/246 |
| 2003/0140121 A1 | 7/2003 | Adams | |
| 2003/0140159 A1 * | 7/2003 | Campbell et al. | 709/231 |
| 2004/0031058 A1 | 2/2004 | Reisman | |
| 2004/0073512 A1 | 4/2004 | Maung | |
| 2004/0191748 A1 | 9/2004 | Thean et al. | |
| 2004/0199575 A1 | 10/2004 | Geller | |
| 2006/0080614 A1 | 4/2006 | Lentz | |
| 2007/0035614 A1 * | 2/2007 | Tamaru et al. | 348/14.08 |
| 2007/0245248 A1 * | 10/2007 | Christiansen | 715/753 |
| 2011/0302506 A1 * | 12/2011 | Noyes et al. | 715/753 |

OTHER PUBLICATIONS

Written Opinion for corresponding International Application No. PCT/US2007/009019, mailed Oct. 2, 2007 (6 pages).

International Search Report for PCT Application No. PCT/US2007/013989, mailed Apr. 3, 2008, 4 pages.

Written Opinion for PCT Application No. PCT/US2007/013989, mailed Apr. 3, 2008, 5 pages.

User Guide—Global Crossing Live Meeting Powered by Microsoft, Global Crossing, 2005, pp. 1-55.

Egevang et al., "The IP Network Address Translator (NAT)," [online]. Request for Comments: 1631, May 1994, [retrieved Oct. 29, 2009]. Retrieved from the Internet: <http://www.safety.net/rfc1631.txt>, 9 pages.

* cited by examiner

SYSTEMS AND METHODS FOR DISPLAYING TO A PRESENTER VISUAL FEEDBACK CORRESPONDING TO VISUAL CHANGES RECEIVED BY VIEWERS

FIELD OF THE INVENTION

The present invention relates to methods for sharing screen data across a number of computing devices on a network. More specifically, the invention relates to displaying feedback to a presenter relating to the screen data received by viewers.

BACKGROUND OF THE INVENTION

Many applications currently exist for sharing screen data among a number of computer users. When a presenter changes the screen data currently being shared, the changes may then be transmitted to the other users such that their screen data is also updated. For example, applications exist which allow a slide presentation displayed on a given computer to be transmitted across a network such that the presentation can be viewed by a number of viewers. When the presenter changes to a new slide, the change may then be transmitted to all the viewers such that their screens may be updated.

However, in many networks transmission of data may involve unknown latencies or loss rates. Thus a given presenter may not know whether a given change to the shared screen data has been received by all the viewers of a presentation. The presenter may wish to wait for a given number of users, or to tailor his or her remarks appropriately for the visual data actually received by the viewers. Thus there exists a need for displaying to a presenter information corresponding to the changes in screen data that have been received by a given viewer or viewers.

SUMMARY OF THE INVENTION

In one aspect, the present invention relates to a method of providing to a presenter visual feedback regarding the screen data received by one or more viewers in an online presentation environment having a presenter transmitting screen data to one or more viewers over a network. In one embodiment the method comprises: transmitting data representing changed visual data; receiving confirmation of receipt of the changed visual data from one or more viewers; generating a representation of the visual data received by one or more viewers responsive to the received confirmation data; and displaying the generated representation at a presenter.

In another aspect, the present invention relates to a computer system for providing to the presenter visual feedback regarding the screen data received by one or more viewers in an online presentation environment having a presenter transmitting screen data to one or more viewers over a network. In one embodiment the system comprises: a transmitter which transmits data representing changed visual data; a receiver which receives confirmation of receipt of the changed visual data from one or more viewers; and a display generator which generates a representation of the visual data received by one or more viewers responsive to the received confirmation data, and which displays the generated representation at the presenter.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE INVENTION

Figure 1:
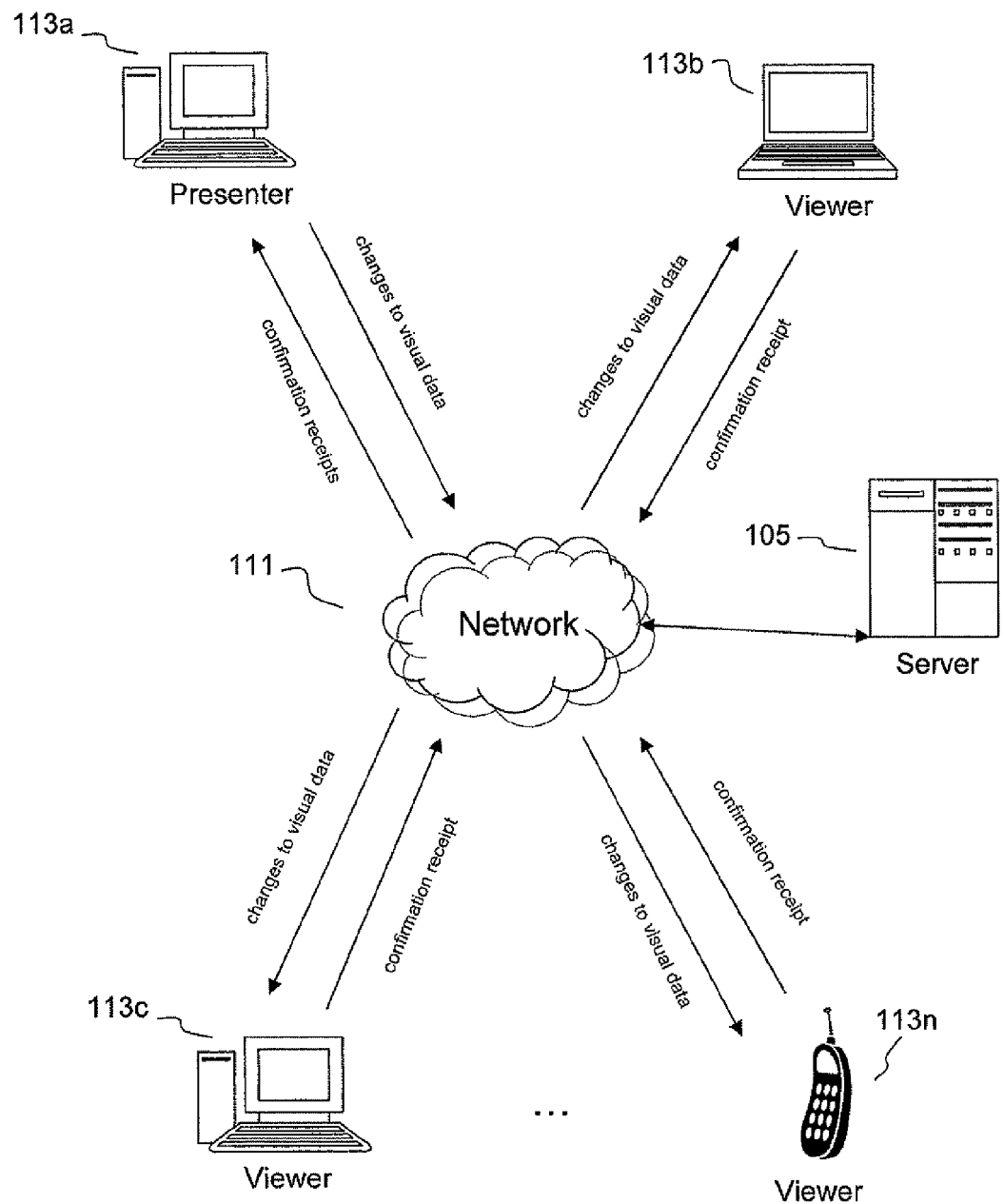
FIG. 1 is a block diagram depicting one embodiment of a computer network used to transmit visual display data and collect feedback from a plurality of viewers.

Referring now to FIG. 1, one embodiment of a computer network is depicted. In brief overview, a number of clients 113a, 113b, 113c, ..., 113n (collectively referred to as 113), are connected via a network 111, to a each other and to a server 105. The clients 113, networks 111, and server 105 may comprise any computing devices comprising substantially similar capabilities, descriptions, functions, and configurations as described herein, including without limitation personal computers, notebook computers, personal digital assistants, cellular telephones, digital televisions, servers, and blades.

Still referring to FIG. 1 now in greater detail, in the embodiment shown, a number of clients 113 are connected to a network 111. The network 111 may comprise the Internet, local networks, web servers, file servers, routers, databases, computers, servers, network appliances, or any other computing devices capable of sending and receiving information. The network may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEEE 802.11b, IEEE 802.11g and direct asynchronous connections, or any combination thereof. The network 111 may comprise mobile telephone networks utilizing any protocol or protocols used to communicate among mobile devices, including AMPS, TDMA, CDMA, GSM, GPRS or UMTS.

In some embodiments, the network configuration shown may be used to share visual information among a plurality of clients 113. In one embodiment, a single client 113a may share visual information with one or more other clients 113. The single client 113a may be referred to as the presenter, the one or more clients may be referred to as viewers, and visual data shared may be referred to as a presentation. Examples of visual information that may be shared include documents, files, slides, images, application displays, and entire computer desktop displays. In some embodiments, the visual data may also be accompanied by other data, including without limitation data files, executable files, and audio data. In some embodiments, the visual data may be accompanied by or comprise part of a videoconferencing data.

In one embodiment, a presenter 113a may transmit the visual data directly to a number of viewers. In another embodiment a presenter 113a may transmit the visual data to a server 105, which then retransmits said visual data to the viewers. In still other embodiments, the viewers, upon receiving the data corresponding to the change, may then transmit an indication that they successfully received the data corresponding to the change in slides. In some embodiments the viewers may transmit the confirmations directly to the presenter. In other embodiments, the viewers may transmit the confirmations to a server 105 which then may retransmit the confirmations or aggregations of the confirmations to the presenter.

Figure 2A:
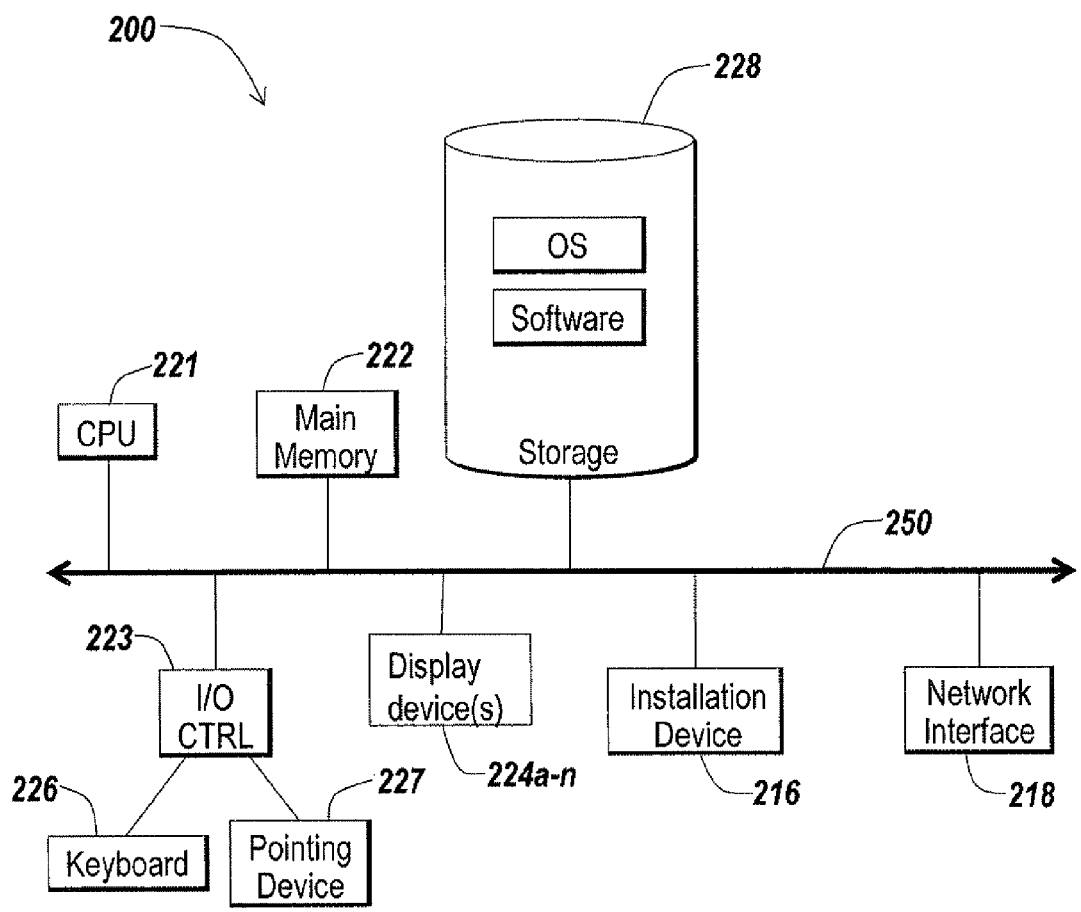
FIGS. 2A and 2B are block diagrams of embodiments of a computing or network device useful as a device in a client-server network.
Figure 2B:
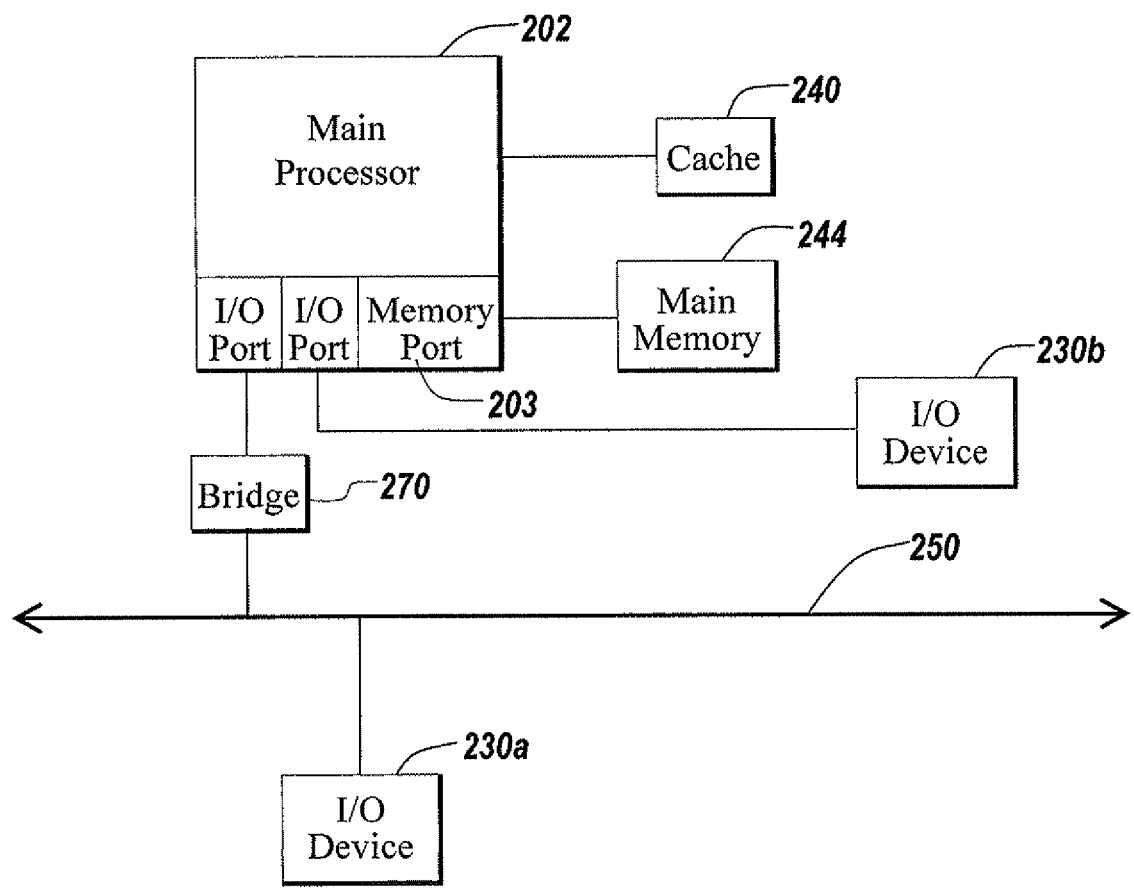

FIGS. 2A and 2B depict block diagrams of a typical computer 200 useful as client computing devices and server computing devices. As shown in FIGS. 2A and 2B, each computer 200 includes a central processing unit 202, and a main memory unit 204. Each computer 200 may also include other optional elements, such as one or more input/output devices 230a-230-b (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 2A, the processor 202 communicates with main memory 204 via a system bus 250 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 250. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 250. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230b via HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, cameras, video cameras, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 250 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

General-purpose computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlet-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 2A and 2B, including the processor 202 and the main memory 204.

Figure 3:
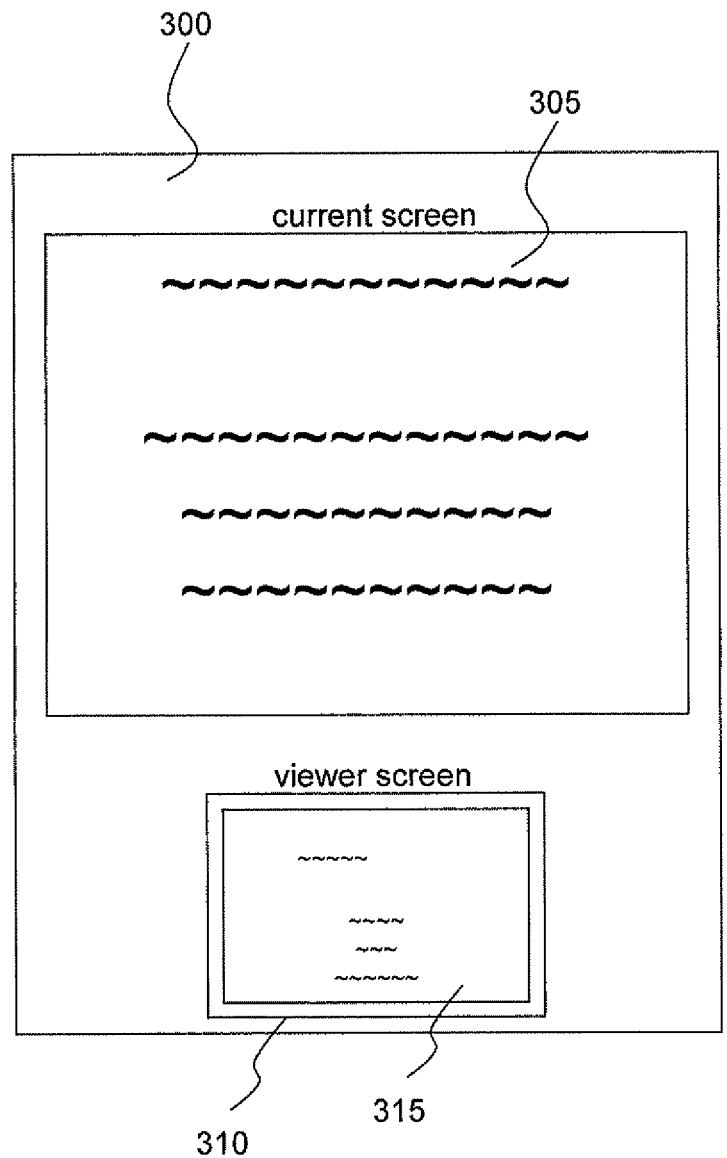
FIG. 3 is a block diagram depicting one embodiment of a display providing to a presenter visual feedback regarding the screen data received by a viewer.

Referring now to FIG. 3, a block diagram depicting one embodiment of a display providing to a presenter visual feedback regarding the screen data received by a viewer is shown. In brief overview, a display 300 comprises a window for displaying the current shared visual display 305 and a window 310 for displaying visual feedback regarding the screen data received by a viewer 315.

Still referring to FIG. 3, now in greater detail, a presenter display screen 300 comprises a window for displaying the current shared visual display 305. The shared visual display may comprise any visual data described herein, including without limitation slides, documents, files, images, an application, or a computer desktop. In some embodiments, the current shared visual display may not be displayed in a window 305, but may instead comprise the entirety of the presenters screen. In other embodiments, the current shared visual display may not be displayed in a window 305, but may instead comprise the entirety of the presenters screen, excluding a given number of windows or other visual information. For example, the current shared visual display may comprise the entirety of the presenters screen with the exception of the window for displaying visual feedback regarding the screen data received by a viewer 310. Or, for example, the current shared visual display may comprise the entirety of the presenters screen with the exception of other visual information corresponding to presentation management functions.

A presenter display screen 300 may also comprise a window 310 for displaying visual feedback regarding the screen data received by a viewer 315. In the embodiment shown, the window 310 comprises a display of the screen data for which a viewer has confirmed receipt 315.

In some embodiments, the visual feedback 315 may be updated periodically. In one embodiment, the visual feedback 315 may be updated at given time intervals, including without limitation any number of microseconds, milliseconds, seconds, or minutes. In another embodiment, the visual feedback 315 may be displayed only in periods following a change in the shared visual display. For example, the window 310 may be hidden or minimized if no changes have been made to the shared visual display 305 for a given time interval. Thus, for example, a presenter may discuss a document for a number of minutes, and then make changes in the document. Upon the presenter's making changes, the window 310 displaying the visual feedback 315 may appear to inform the presenter whether the viewer has successfully received the visual updates.

In the embodiment shown, the display 300 indicates that the screen data received by a viewer 315 may be different than the current shared visual display 305. This discrepancy may reflect, for example, that the presenter recently changed slides, and the viewer has yet to receive or confirm receipt of the visual data corresponding to the most recent slide. Or the discrepancy may reflect, for example, that the presenter recently typed text into the shared visual display, and the viewer has yet to receive or confirm receipt of the visual data corresponding to the entered text.

In some embodiments, the visual feedback display may be modified 315, such as reduced in size, reduced in color bit depth, and rendered in black and white or grayscale. In other embodiments, any other display property of the screen data shown in the feedback display 315 may be altered, including without limitation color, contrast, sharpness, and brightness. In other embodiments, the presenter machine may generate a visual representation of the screen data received by the viewer using any combination of techniques described herein. For example, the presenter machine may generate a display corresponding to the current screen data confirmed as received by a given viewer, where the display is rendered at $1/15^{th}$ size, and in black and white.

Figure 4:
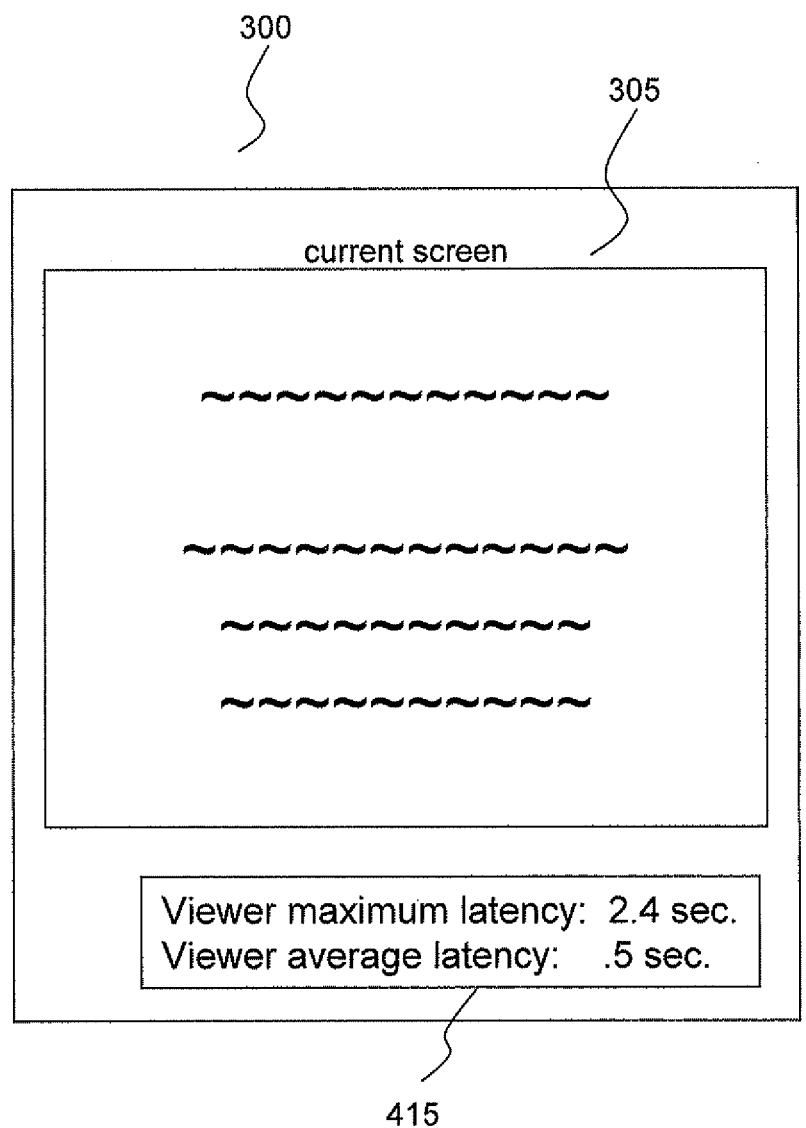
FIG. 4 is a block diagram depicting one embodiment of a display providing to a presenter visual feedback regarding the screen data received by a plurality of viewers.

Referring now to FIG. 4, a block diagram depicting one embodiment of a display providing to a presenter visual feedback regarding the screen data received by a plurality of viewers is shown. In brief overview, a display 300 comprises a window for displaying the current shared visual display 305 and visual feedback regarding the screen data received by a plurality of viewers 415.

Still referring to FIG. 4, now in greater detail, visual feedback regarding the screen data received by a plurality of viewers 415 comprises a display of latency corresponding to a plurality of viewers. In some embodiments, any measure of latency may be displayed, including without limitation minimum latency, maximum latency, mean latency, median latency, and mode latency. In some embodiments, latency corresponding to a specific viewer or viewers may be displayed.

In some embodiments, the displayed latency may reflect the time between the time the presenter makes a change to the shared visual display 305 and the time that confirmation is received by the presenter that the change has been received by one or more predetermined viewers. In other embodiments, the displayed latency may reflect the time between the time that the presenter makes a change to the shared visual display 305 and the time that the change is received by one or more predetermined viewers.

In some embodiments, the latency may be displayed using text, as in the embodiment shown. In other embodiments, latency may be displayed using any technique for the display of data, including without limitation charts, graphs, histograms, plots, color coding, and icons. For example, a mean latency indicator may be displayed which is green while average latency is low, but transitions to red as latency increases.

In other embodiments, other statistics relating to the transmission of screen data may be displayed, including without limitation estimated bandwidth, network loss rates, and total number of viewers who have not received a given change.

Figure 5:
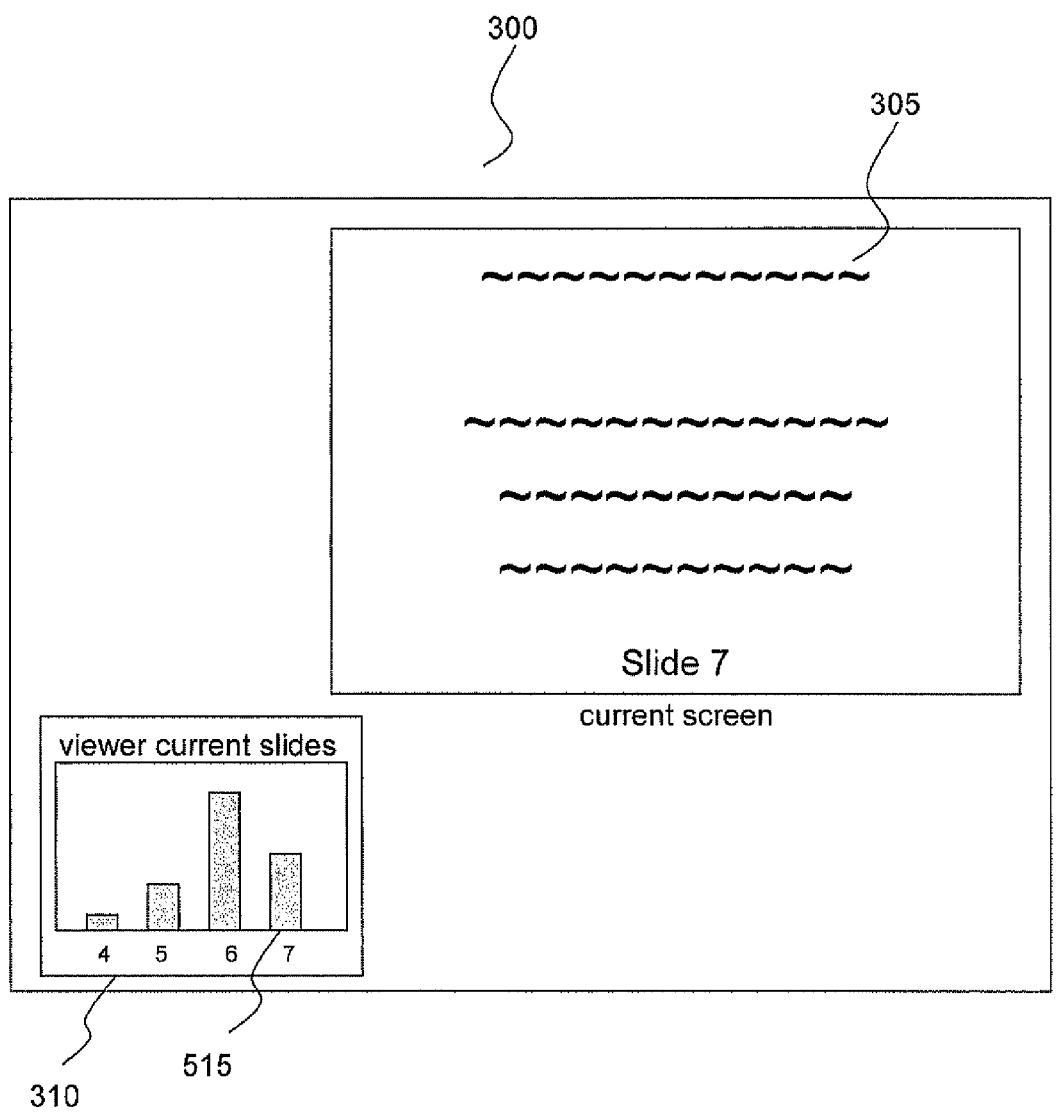
FIG. 5 is a block diagram depicting another embodiment of a display providing to a presenter visual feedback regarding the screen data received by a plurality of viewers.

Referring now to FIG. 5, a block diagram depicting another embodiment of a display providing to a presenter visual feedback regarding the screen data received by a plurality of viewers is shown. In brief overview, a display 300 comprises a window for displaying the current shared visual display 305 and a window 310 for the display of a chart corresponding to the screen data received by a plurality of viewers 515.

Still referring to FIG. 5, now in greater detail, a display of visual feedback regarding the screen data received by a plurality of viewers 515 comprises a chart indicating how many viewers have received given screen data. In the embodiment shown, the shared visual display 300 corresponds to a slide presentation. The visual feedback 515 displays the percentage of viewers who have received a given slide. For example, in the embodiment shown, the current shared visual display is slide number 7. The chart 515 illustrates that a significant number of viewers have not yet received the data corresponding to the change to slide 7. The chart 515 further illustrates that most of the viewers may still be currently viewing slide 6, although a smaller fraction of users may still be viewing slides 5 and 4, respectively.

In other embodiments, the visual feedback 515 may comprise a chart displaying other data regarding the screen data received by viewers. In one embodiment, a chart may display the absolute number of viewers who have received a given change to screen data. In another embodiment, a chart may display any measure of latency as discussed herein.

In other embodiments, any chart type may be used, including without limitation a bar graph, line graph, xy plot, scatter plot, histogram, or pie chart. In still other embodiments any other visual representation of data may be used, including without limitation icons, color-codes, and graphics.

Figure 6:
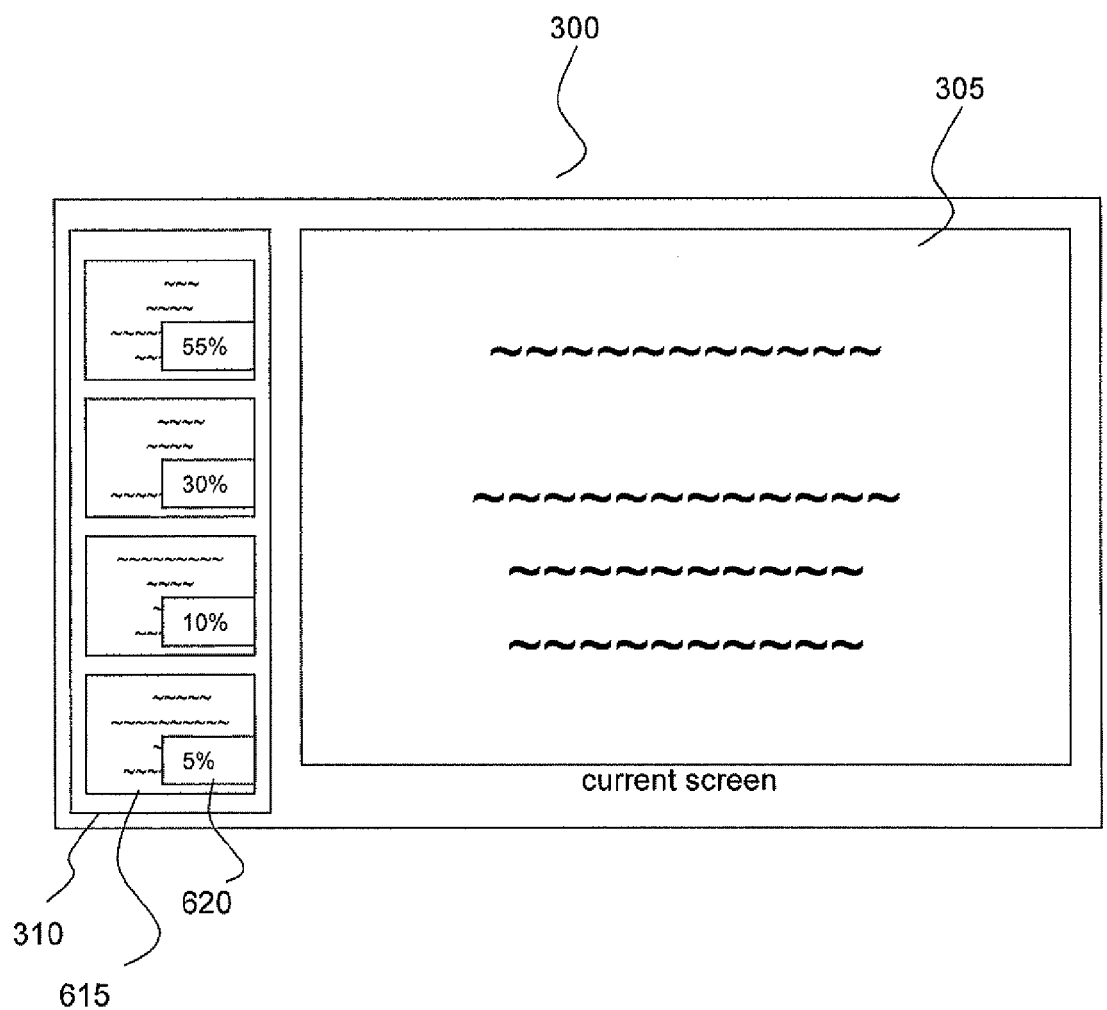
FIG. 6 is a block diagram depicting another embodiment of a display providing to a presenter visual feedback regarding the screen data received by a plurality of viewers.

Referring now to FIG. 6, a block diagram depicting another embodiment of a display providing to a presenter visual feedback regarding the screen data received by a plurality of viewers is shown. In brief overview, a display 300 comprises a window for displaying the current shared visual display 305 and a window 310 for the display of visual feedback regarding the screen data received by a plurality of viewers 615.

Still referring to FIG. 6, visual feedback regarding the screen data received by a plurality of viewers 615 comprises a number of simulated displays with percentages attached indicating what percentage of viewers may be currently displaying the simulated display. In some embodiments, any number of simulated displays and percentages may be displayed. In one embodiment, simulated displays and percentages may be displayed corresponding to a series of changes in display data. For example, in the embodiment shown, the presentation comprises a slide show, and the four simulated displays may comprise the four most recent slides. The displayed percentages may indicate, for example, that 55% of viewers have confirmed receipt of the change in visual data corresponding to the most recent slide. The displayed percentages may also indicate, for example, that 5% of the viewers have yet to acknowledge receipt of the changes corresponding to the three most recent slides, and thus still may be viewing the slide shown three slides ago.

Figure 7:
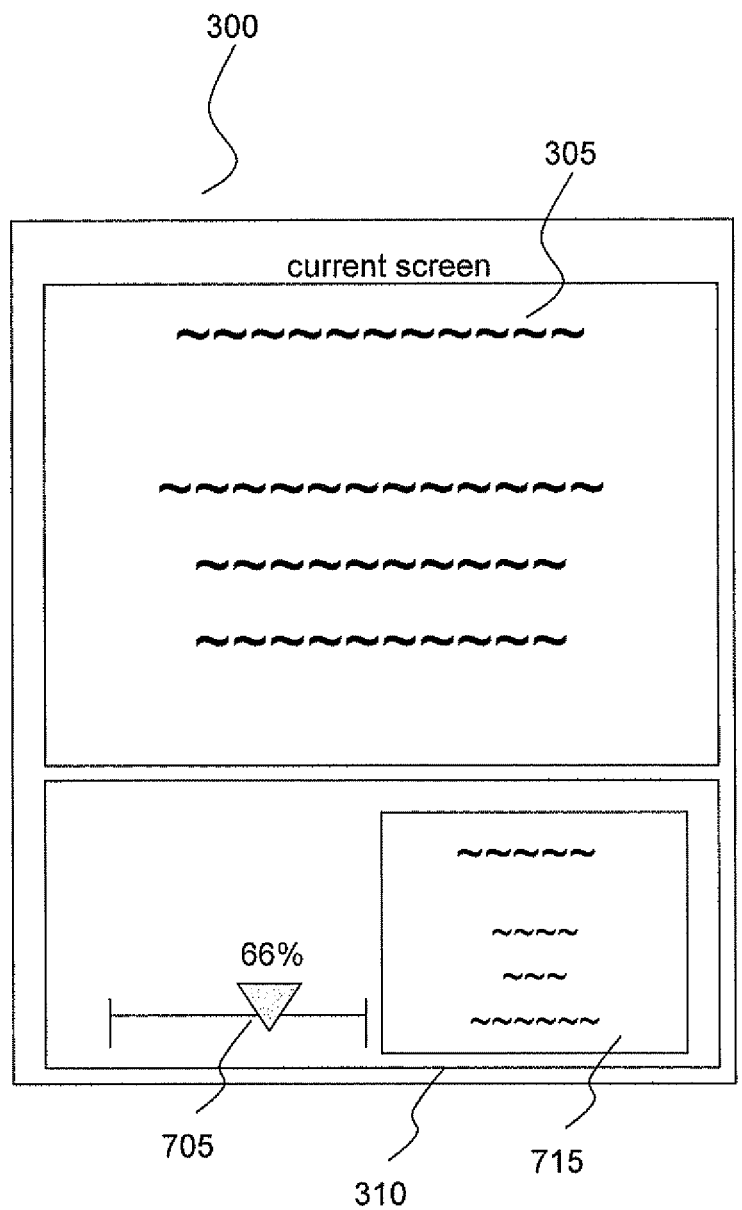
FIG. 7 is a block diagram depicting an embodiment of a display providing to a presenter visual feedback regarding the screen data received by a plurality of viewers in response to input from the presenter.

Referring now to FIG. 7, a block diagram depicting an embodiment of a display providing to a presenter visual feedback regarding the screen data received by a plurality of viewers in response to input from the presenter. In brief overview, a display 300 comprises a window for displaying the current shared visual display 305 and a window 310 for the display of visual feedback regarding the screen data received by a plurality of viewers 715. The window 310 also comprises an input mechanism for a presenter to specify a given percentage of viewers.

Still referring to FIG. 7, now in greater detail, a window 310 for the display of visual feedback regarding the screen data received by a plurality of viewers comprises an input mechanism for a presenter to specify a given percentage of viewers. In the embodiment shown, a slider 705 can be set to a given percentage. The feedback display 715 then displays the most recent visual change confirmed as received by the given percentage of users. For example, a presenter to a large number of viewers might want to know when 80% of the viewers have received a given change in visual data. The presenter could then set the slider to 80%, and observe the most recent visual change confirmed as received by 80% of the audience.

In other embodiments, the input device may comprise any other input mechanism, including without limitation a button, radio buttons, text field, and menu. For example, a presenter may use a menu to select a given percentage of viewers. Or for example, a menu could be used to select a given viewer or plurality of viewers, and the feedback display 715 may then show the visual changes currently confirmed as received by that particular viewer or plurality of viewers.

In other embodiments, previously or currently shared screen data may be selected to be tracked. In one embodiment, a button or other input device may be provided which allows the presenter to take a 'snapshot' of the presenter's current screen to select the shared screen data to be tracked. In another embodiment, the screen data to be tracked may be automatically selected. For example, the presenter machine may select the screen data to be tracked by a statistical computation using the confirmations of receipt received from the viewers such as, for example, identifying the screen data for which a plurality of the most recent receipts received correspond.

The percentage of viewers (or any other statistical measure of viewers) that have confirmed the screen data being tracked may then be visualized in any manner described herein. In the embodiment shown, the selected screen data to be tracked is displayed in window 315 and the percentage of viewers that have confirmed the selected visual change is visualized using a read-only slider 705. Or for example, clicking on feedback display 715 might bring up a list of the particular viewers corresponding to the given feedback. The presenter may then be able see how many viewers have currently received at least the visual data corresponding to that particular 'snapshot'."

In some embodiments, an input device may be combined with any of the other feedback displays described herein. For example, the bar graph 515 in FIG. 5 might be made interactive, such that if a presenter clicked on a given bar, the screen may display a visual representation of the visual changes confirmed as received by the group of viewers corresponding to the bar clicked. Or for example, clicking an individual feedback displays 615 in FIG. 6 might bring up a list of the particular viewers corresponding to the given feedback. Or for example, a button may be provided which allows the presenter to take a 'snapshot' of the presenter's current screen to be displayed in one of the individual feedback displays 615 such as in FIG. 6. The presenter may then be able to see how many viewers have currently received the visual data corresponding to that particular screen.

Figure 8:
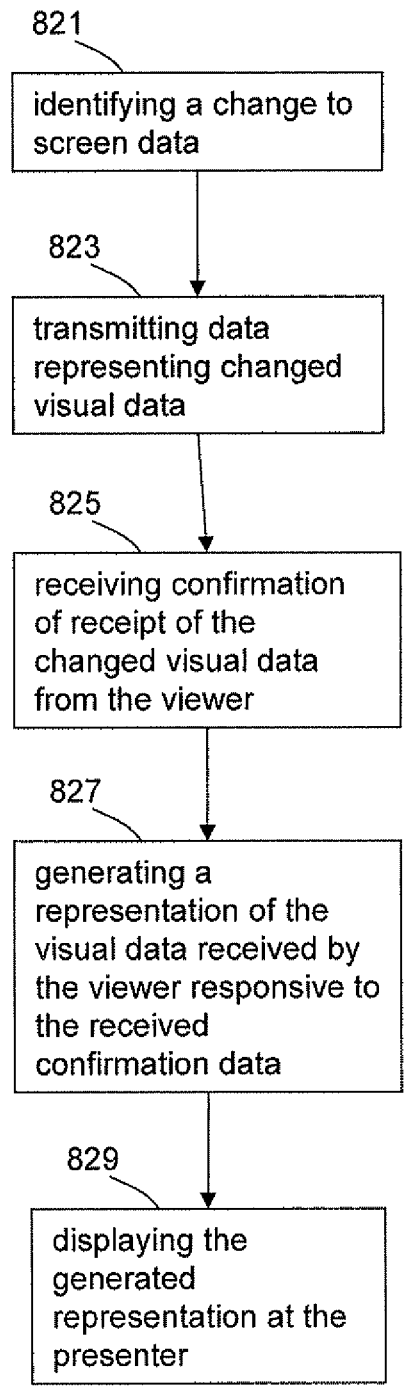
FIG. 8 is a block diagram depicting one embodiment of a method for providing to a presenter visual feedback regarding the screen data received by a viewer.

Referring now to FIG. 8, a block diagram depicting one embodiment of a method for providing to a presenter visual feedback regarding the screen data received by a viewer is shown. In brief overview, the method comprises; identifying a change to screen data (step 821); transmitting data representing changed visual data (step 823); receiving confirmation of receipt of the changed visual data from the viewer (step 825); generating a representation of the visual data received by the viewer responsive to the received confirmation data (step 827); and displaying the generated representation at the presenter (step 829). The method may be performed by any single computing device 200 or plurality of computing devices described herein. In the description below, the method will be described in the context of being performed by a presenter machine.

Still referring to FIG. 8, now in greater detail, a presenter machine identifies a change to screen data (step 821). The change to screen data may comprise any alteration, addition, or removal of screen data on the presenter screen. Examples of changes to screen data may include a presenter typing text into a document, opening a slide presentation, moving to a subsequent slide in presentation, opening a document or file, a change in the display of an application, or a moving of an icon in a desktop.

The presenter machine may identify a change to screen data (step 821) using any known or proprietary technique for identifying events. In some embodiments, the presenter machine may identify a change to screen data by assigning a sequence number to the change in screen data. A subsequent change to screen data may then be assigned a successive sequence number. In another embodiment, the presenter machine may identify a change to screen data by assigning any other unique identifier to the change in screen data.

In some embodiments, changes to screen data may be grouped together based on input from the presenter. For example changes to screen data resulting from a series of keystrokes may be treated as a single change to screen data for identification purposes. Or, for example, changes to screen data resulting from an icon being dragged across a screen may be treated as a single change to screen data for identification purposes. In other embodiments, a set of intermediate changes may be grouped together while the network is busy transmitting previous changes. In yet other embodiments, changes that occur within a given time period may be grouped together.

After identifying a change to screen data (step 821), the presenter machine may transmit data representing changed visual data (step 823). The transmission may be via any network and protocol described herein. The presenter machine may transmit data representing changed visual data to any number of viewers. In some embodiments, the presenter machine may transmit the data representing changed visual data along with a corresponding identifier as described herein. In some embodiments, the data representing changed visual data may comprise control data corresponding to an instruction for the viewer to display a given slide or portion of a file. In other embodiments, the data representing changed visual data may comprise graphical data corresponding to the updated visual data.

After transmitting data representing changed visual data (step 823), the presenter machine may receive confirmation of receipt of the changed visual data from the viewer (step 825). The confirmation may be received via any network or protocol described herein. In some embodiments, the confirmation may comprise an identifier corresponding to the changed visual data as described herein. In some embodiments, the presenter machine may receive confirmation of receipt of the changed visual data from a plurality of viewers.

In some embodiments, a server 105 or other computing device separate from the presenter machine may receive confirmation of receipt of the changed visual data from the viewer (step 825). For example, if a presentation is being delivered to a large number of viewers, a server 105 may be designated to receive confirmation of receipt of the changed visual data from the viewers (step 825) in order to relieve load from the presenter machine.

After receiving confirmation of receipt of the changed visual data from the viewer (step 825), the presenter machine may generate a representation of the visual data received by the viewer responsive to the received confirmation data (step 827) Said generation may be done in accordance with any of the embodiments described herein. In some embodiments, the generated representation may comprise a simulated viewer screen. For example, a presenter may be moving through a series of slides. The presenter machine may receive, from a given viewer, confirmation of receipt of changes in visual data corresponding to the display of the first, second, and third slide. The presenter machine may then generate a representation of the third slide.

In some embodiments, the presenter machine may generate a representation of the visual data received by the viewer responsive to the received confirmation data, and modify the rendering of said representation according to any of the techniques described herein.

In some embodiments, a server 105 or other computing device separate from the presenter machine may generate a representation of the visual data received by the viewer responsive to the received confirmation data (step 825). For example, if a presentation is being delivered to a large number of viewers, a server 105 may be designated to receive confirmation of receipt of the changed visual data from the viewers (step 825) and generate a visual representation of said feedback.

After generating a representation of the visual data received by the viewer responsive to the received confirmation data (step 827), the presenter machine may display the generated representation at the presenter (step 829). The generated representation may be displayed in any manner described herein.

Figure 9:
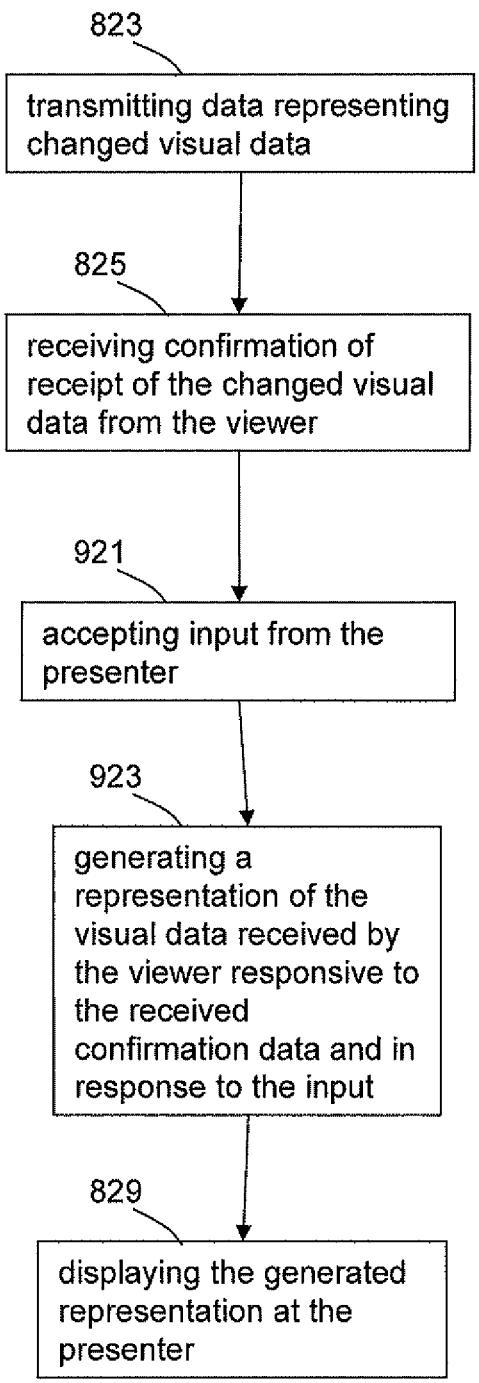
FIG. 9 is a block diagram depicting one embodiment of a method for providing to a presenter visual feedback regarding the screen data received by a plurality of viewers in response to input from the presenter.

Referring now to FIG. 9, a block diagram depicting one embodiment of a method for providing to a presenter visual feedback regarding the screen data received by a plurality of viewers in response to input from the presenter is shown. In brief overview, the method comprises: transmitting data representing changed visual data (step 823); receiving confirmation of receipt of the changed visual data from the viewer (step 825); accepting input from the presenter (step 921); generating a representation of the visual data received by the viewer responsive to the received confirmation data and in response to the input (step 827); and displaying the generated representation at the presenter (step 829). The method may be performed by any single computing device 200 or plurality of computing devices described herein. In the description below, the method will be described in the context of being performed by a presenter machine.

Still referring to FIG. 9, now in greater detail, the presenter machine may transmit data representing changed visual data (step 823). This step may be performed in accordance with any embodiment described herein.

After transmitting data representing changed visual data (step 823), the presenter machine may receive confirmation of receipt of the changed visual data from the viewer (step 825). This step may be performed in accordance with any embodiment described herein.

After receiving confirmation of receipt of the changed visual data from the viewer (step 825), the presenter machine may accept input from the presenter (step 921). The input may be accepted using any input device described herein. In some embodiments, the input may comprise a given percentage of viewers. In other embodiments, the input may correspond to a given change in visual data. In still other embodiments, the input may correspond to a given number of viewers. In some embodiments, the presenter machine may then transmit said input data to a server 105, such that the server may then aggregate appropriate data for responding to the input. In other embodiments the presenter machine may then transmit said input data to a server 105, such that the server may then generate a visual feedback display in response to the input.

After accepting input from the presenter (step 921), the presenter machine may generate a representation of the visual data received by the viewer responsive to the received confirmation data and in response to the input (step 923). This step may be performed in accordance with any embodiment described herein.

After generating a representation of the visual data received by the viewer responsive to the received confirmation data and in response to input (step 923), the presenter machine may display the generated representation at the presenter (step 829). The generated representation may be displayed in any manner described herein.

Although the above embodiments have been described with respect to a single presenter, they may be applied equally to scenarios in which multiple users can alter screen data. For example, if four users were working on a single document, all four users may see a screen such as FIG. 6, which might display the current visual changes received by all the other participants. Or for example, a presenter may pass control to a given viewer, after which the viewer becomes the presenter.

While the invention has been particularly shown and described with reference to specific preferred embodiments, it should be understood by those skilled in the art that various changes in form and detail may be made therein departing from the spirit and scope of the invention as defined by the appended claims.

I claim:

1. In an online presentation environment having a presenter computing device transmitting screen data to a viewer computing device over a network, a method of providing to the presenter computing device visual feedback regarding the screen data received by the viewer computing device, the method comprising:
    (a) transmitting, to the viewer computing device, data representing an identified change to the screen data, the identified change to the screen data being displayed in a first window at the presenter computing device;
    (b) receiving, from the viewer computing device, a confirmation of receipt of the identified change to the screen data, the received confirmation comprising an identifier of the identified change to the screen data;
    (c) generating, using the identifier in the received confirmation, a visual representation of the identified change to the screen data received by the viewer computing device, the generated visual representation comprising a simulated viewer screen, the simulated viewer screen comprising at least one image transmitted from the presenter computing device to the viewer computing device; and
    (d) displaying the generated visual representation, including the simulated viewer screen, in a second independent window at the presenter computing device and at a size smaller than that of the screen data displayed in the first window at the presenter computing device, wherein the generated visual representation comprises a display of latency corresponding to the viewer computing device, and wherein the latency corresponding to the viewer computing device is measured as a time between when the screen data is changed at the presenter computing device and when the confirmation of receipt of the identified change to the screen data is received at the presenter computing device.

2. The method of claim 1, wherein the data transmitted to the viewer computing device comprises a first sequence indicator.

3. The method of claim 1, wherein the confirmation comprises a second sequence indicator.

4. The method of claim 1, wherein the visual representation of the identified change to the screen data received by the viewer computing device is rendered using a color bit depth less than that of the screen data at the presenter computing device.

5. The method of claim 1, wherein the visual representation of the identified change to the screen data received by the viewer computing device is rendered using a grayscale color palette.

6. The method of claim 1, wherein the visual representation of the identified change to the screen data received by the viewer computing device is rendered using a black and white color palette.

7. The method of claim 1, further comprising, before transmitting the data to the viewer computing device, identifying the change to the screen data.

8. The method of claim 1, wherein the data is transmitted to a plurality of viewer computing devices.

9. The method of claim 8, wherein the confirmation of receipt is received from a subset of the plurality of viewer computing devices.

10. In an online presentation environment having a presenter computing device transmitting screen data to a plurality of viewer computing devices over a network, a method of providing, to the presenter computing device, visual feedback regarding the screen data received by the plurality of viewer computing devices, the method comprising:
    (a) transmitting, to the plurality of viewer computing devices, data representing an identified change to the screen data;
    (b) receiving, from a subset of the plurality of viewer computing devices, a confirmation of receipt of the identified change to the screen data, the received confirmation comprising an identifier of the identified change to the screen data;
    (c) generating, using the identifier in the received confirmation, a visual representation indicating a percentage of the plurality of viewer computing devices represented by the subset and a simulated viewer screen, the simulated viewer screen comprising at least one image transmitted from the presenter computing device to the subset of the plurality of viewer computing devices; and
    (d) displaying the generated visual representation at the presenter computing device, wherein the generated visual representation comprises a display of latency corresponding to one of the plurality of viewer computing devices, and wherein the latency corresponding to the one of the viewer computing devices is measured as a time between when the screen data is changed at the presenter computing device and when the confirmation of receipt of the identified change to the screen data is received at the presenter computing device.

11. The method of claim 10, wherein the visual representation represents the screen data received by the subset of the plurality of viewer computing devices.

12. The method of claim 11, wherein the visual representation comprises a chart.

13. The method of claim 10, wherein the visual representation represents the most recent screen data received by the entire plurality of viewer computing devices.

14. The method of claim 10, further comprising:
    accepting input, from the presenter, of an identifier corresponding to a set of visual data; and
    generating a representation of the percentage of viewer computing devices from which confirmation of receipt of the identifier was received.

15. The method of claim 10, further comprising:
  identifying a set of visual data based on a statistical analysis of the received confirmation; and
  generating a representation of the percentage of viewer computing devices from which confirmation of receipt was received corresponding to the identified set of visual data.

16. The method of claim 10, further comprising accepting input, from the presenter computing device, of a given percentage, and wherein the visual representation represents the most recent identified change to the screen data for which confirmation of receipt was received from a given percentage of viewer computing devices.

17. In an online presentation environment having a presenter computing device transmitting screen data to a viewer computing device over a network, a system for providing to the presenter computing device visual feedback regarding the screen data received by the viewer computing device, the system comprising:
  a transmitter transmitting, to the viewer computing device, data representing an identified change to the screen data, the changed screen data displayed in a first window at the presenter;
  a receiver receiving, from the viewer computing device, a confirmation of receipt of the identified change to the screen data, the received confirmation comprising an identifier of the identified change to the screen data; and
  a display generator i) generating, using the identifier in the received confirmation, a visual representation of the identified change to the screen data received by the viewer computing device, the generated visual representation comprising a simulated viewer screen, the simulated viewer screen comprising at least one image transmitted from the presenter computing device to the viewer computing device; and ii) displaying the generated visual representation, including the simulated viewer screen, in a second independent window at the presenter computing device and at a size smaller than that of the screen data displayed in the first window at the presenter computing device, wherein the generated visual representation comprises a display of latency corresponding to the viewer computing device, and wherein the latency corresponding to the viewer computing device is measured as a time between when the screen data is changed at the presenter computing device and when the confirmation of receipt of the identified change to the screen data is received at the presenter computing device.

18. The system of claim 17, wherein the data transmitted to the viewer computing device comprises a first sequence indicator.

19. The system of claim 17, wherein the confirmation comprises a second sequence indicator.

20. The system of claim 17, wherein the display generator is configured to render the visual representation of the identified change to the screen data received by the viewer computing device using a color bit depth less than that of the screen data at the presenter computing device.

21. The system of claim 17, wherein the display generator is configured to render the visual representation of the identified change to the screen data received by the viewer computing device using a grayscale color palette.

22. The system of claim 17, wherein the display generator is configured to render the visual representation of the identified change to the screen data received by the viewer computing device using a black and white color palette.

23. The system of claim 17, further comprising a processor for identifying the change to the screen data.

24. The system of claim 17, wherein the transmitter is configured to transmit the data to a plurality of viewer computing devices.

25. The system of claim 24, wherein the receiver is configured to receive the confirmation of receipt from a subset of the plurality of viewer computing devices.

26. The system of claim 25, wherein the display generator is further configured to generate a representation indicating a percentage of the plurality of viewer computing devices represented by the subset.

27. The system of claim 25, wherein the visual representation of the identified change to the screen data represents the identified change to the screen data received by the subset of the plurality of viewer computing devices.

28. The system of claim 25, wherein the display generator is further configured to generate a chart corresponding to the number of viewer computing devices from which confirmation of receipt of the identified change to the screen data corresponding to a given page was received.

29. The system of claim 25, wherein the visual representation of the identified change to the screen data represents the most recent identified change to the screen data received by the entire plurality of viewer computing devices.

30. The system of claim 25, wherein the display generator is further configured to i) identify a set of visual data based on a statistical analysis of the received confirmation, and ii) generate a representation of the percentage of viewer computing devices from which confirmation of receipt was received corresponding to the identified set of visual data.

31. The system of claim 25, further comprising an input device for accepting input, from the presenter computing device, of an identifier corresponding to a set of visual data, and wherein the display generator is further configured to generate a representation of the percentage of viewer computing devices from which confirmation of receipt of the identifier was received.

32. The system of claim 25, further comprising an input device for accepting input, from the presenter computing device, of a given percentage, and wherein the visual representation of the identified change to the screen data represents the most recent identified change to the screen data for which confirmation of receipt was received from the given percentage of viewer computing devices.

33. The system of claim 17, wherein at least one of the transmitter and the receiver are located on a server intermediate to the presenter computing device and the viewer computing device.

* * * * *